United States Patent [19]

Behlmer et al.

[11] 4,380,249

[45] Apr. 19, 1983

[54] STEERING CLUTCH AND BRAKE CONTROL VALVE

[75] Inventors: Wilbur D. Behlmer; John J. Kass, both of Dubuque, Iowa

[73] Assignee: Deere & Company, Moline, Ill.

[21] Appl. No.: 265,935

[22] Filed: May 21, 1981

[51] Int. Cl.³ .............................................. F15B 13/07
[52] U.S. Cl. .................................. 137/596.2; 137/871; 192/12 C; 192/13 R
[58] Field of Search ............................. 137/596.2, 871; 192/12 C, 13 R

[56] References Cited

U.S. PATENT DOCUMENTS

| | | | |
|---|---|---|---|
| 2,941,639 | 6/1960 | Christenson et al. | 192/13 |
| 3,374,846 | 3/1968 | Massone | 192/13 R X |
| 3,815,631 | 6/1974 | Shaw | 137/596 |

Primary Examiner—Gerald A. Michalsky

[57] ABSTRACT

Right- and left-hand steering clutch and brake control valves each include a valve plunger, brake control spool and clutch control spool arranged in serial order in a valve bore with coil compression springs being interposed between the plunger and brake control spool, between the brake and clutch control spools and between the clutch control spool and an end of the bore. The reacting force on the control spools is a spring and constant hydraulic force while the applied force is by way of springs and hydraulic function pressure.

1 Claim, 1 Drawing Figure

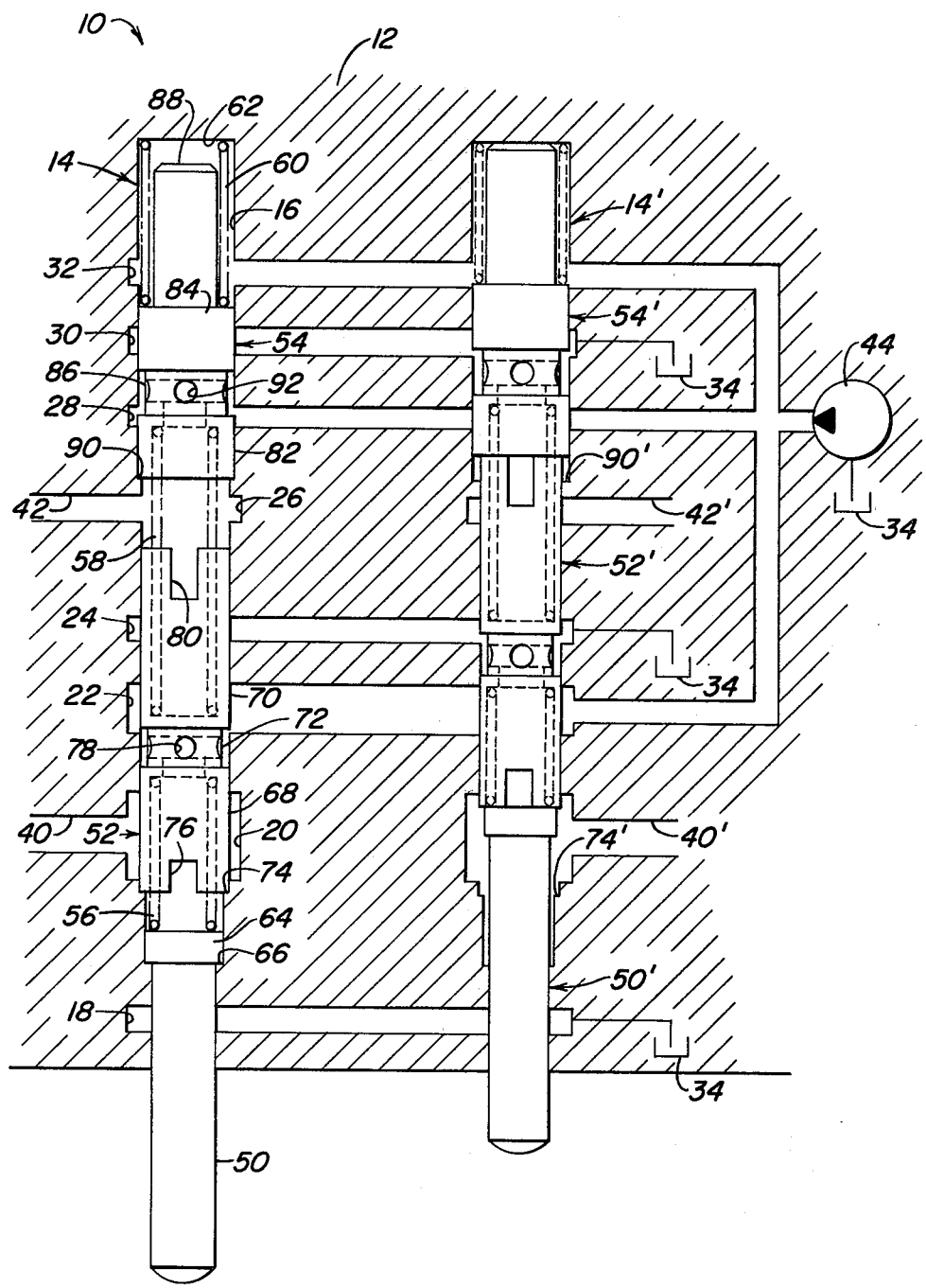

STEERING CLUTCH AND BRAKE CONTROL VALVE

BACKGROUND OF THE INVENTION

The present invention relates to steering controls and more particularly relates to a hydraulic control valve for actuating steering brakes and clutches of a track-laying vehicle.

Track-laying vehicles normally comprise two tracks, one on either side of the vehicle, which have drive sprockets engaged therewith. Power is transmitted to the drive sprockets by respective drive assemblies which each include a clutch and a brake. When the vehicle is travelling straight ahead, both clutches are engaged and both brakes are disengaged so that both drive sprockets are driven at equal speeds by the vehicle engine. If it is desired to turn the vehicle to one side or the other, one or the other of the clutches is disengaged so that the power from the engine is applied solely to one sprocket, thus resulting in the vehicle turning at a gradual radius. If it is desired that the vehicle turn sharper, the non-driven sprocket is braked with the amount of braking force applied, determining the sharpness of the turn.

Heretofore, it has been the practice to control these brakes and clutches hydraulically by means of right- and left-hand control valves which each include a valve plunger which acts through a spring, when depressed, to shift a unitary clutch and brake control spool against clutch and brake control pressure to sequentially effect clutch disengagement and brake engagement. This type of control has the disadvantage that a relatively stiff spring is required between the plunger and the control spool in order to maintain modulation while overcoming the reaction forces exerted on the control spool. U.S. Pat. No. 2,941,639, issued to Christenson et al. on June 21, 1960, discloses a clutch and brake control which exemplifies the prior art controls.

SUMMARY OF THE INVENTION

According to the present invention, there is provided an improved valve for controlling the steering clutches and brakes of a track-laying vehicle.

An object of the invention is to provide a clutch and brake control valve designed such that the force necessary for valve actuation is approximately constant so as to minimize the manual force required and that actuation of a single plunger controls both clutch and brake through controlled disengagement and engagement.

A more specific object of the invention is to provide a valve for controlling a steering clutch and brake which includes a valve plunger for applying a force to a brake control spool by way of a first spring and to a clutch control spool by way of the first spring, the brake control spool and a second spring and to have brake and clutch service ports connected to the bore in such relationship to the brake and clutch control spools that the clutch is disengaged prior to brake engagement and the brake is disengaged prior to the clutch engagement and that each can be controlled through a selected range of partial engagement.

These and other objects will become apparent from a reading of the ensuing description, together with the appended drawing.

BRIEF DESCRIPTION OF THE DRAWING

The sole FIGURE is a transverse cross-section through a track-laying vehicle steering control valve assembly constructed in accordance with the left-hand valve being shown in a brake-released, clutch-engaged position and with the right-hand valve being shown in a fully depressed brake-applied position.

DESCRIPTION OF THE PREFERRED EMBODIMENT

Referring to the drawing, therein is shown a track-laying vehicle steering control valve assembly indicated in its entirety by the reference numeral 10. The control valve 10 comprises a valve body or housing 12 within which is located identical left- and right-hand spool valves 14 and 14', respectively. The spool valve 14 is adapted for controlling a left-hand normally spring-engaged, pressure-releasable brake and a left-hand normally pressure-engageable clutch, and the spool valve 14' is adapted for controlling a right-hand normally spring-engaged, pressure-releasable brake and a right-hand normally pressure-engageable clutch. For the sake of brevity, only the left-hand spool valve 14 is described in detail with the reference numerals used in the description of the elements of valve 14 being applied in primed form to the corresponding elements of valve spool 14'.

The spool valve 14 includes a valve bore 16 provided with a plurality of annular recesses 18, 20, 22, 24, 26, 28, 30, and 32, as considered from bottom to top in the drawing. Internal passages in the valve body 12 interconnect the recesses 18, 22, 24, 28, 30 and 32, respectively, with the corresponding recesses of the valve 14'. The annular recesses 18, 24, and 30 are connected to a sump 34. A brake service port 40 leads to the annular recess 20 while a clutch service port 42 leads to the recess 26.

The recesses 22, 28 and 32 are connected to a source of fluid pressure, here shown as a pump 44.

Reciprocably mounted in the bore 16 for controlling the flow of fluid among the various recesses therein are a valve plunger 50, a brake control spool 52 and a clutch control spool 54, as considered from bottom to top in the drawing. Three coil compression springs 56, 58 and 60 are respectively located between the plunger 50 and spool 52, between the spool 52 and spool 54 and between the spool 54 and an end wall 62 of the bore 16.

The plunger 50 has an enlarged upper end 64 which is normally biased against an upwardly facing annular surface 66 at the lower end of the bore 16. The plunger 50 extends through the drain-connected recess 18 with the latter acting to ensure free movement of the plunger and eliminate pressure at an oil seal.

The lower and upper end portions of the brake control spool 52 are respectively formed by lands 68 and 70, which are separated by an annular groove 72. The lower and upper ends of the spool 52 are hollow and respectively serve to retain the upper end portion of the spring 56 and the lower end portion of the spring 58. When the valve 14 is in its normal brake-released, clutch-engaged position, as shown, the lower end of the spool 52 is biased against an upwardly facing annular surface 74 formed in the bore 16 just downwardly of the recess 20. In this position of the spool, the hollow lower end thereof is placed in fluid communication with the brake service port 40 by a plurality of notches 76 (only one shown) in the lower end of the spool. The hollow interior of the lower end of the spool 52 is then, in turn, connected in fluid communication with the pressure inlet recess 22 by means of a passage 78 in the spool which extends to the hollow interior from the groove 72. The upper end of the spool 52 is provided with a plurality of notches 80 (only one shown) which have a purpose explained below.

The clutch control spool 54 has a lower portion formed by a hollow land 82 which serves to retain the upper end portion of the spring 58. The spool 54 further includes a land 84 separated from the land 82 by a groove 86. A stem 88 projects upwardly from the upper side of the land 84 and serves as a guide for the spring 60, which encircles the stem 88 and has its lower end engaged with the land 84. When the valve 14 is in its normal brake-released, clutch-engaged position, as shown, the lower end of the land 82 is biased into engagement with an upwardly facing annular surface 90 formed in the bore 16 just upwardly of the clutch service port 42. In this position, the land 82 is located so as to not block the pressure inlet recess 28 while the land 84 is located in blocking relationship to the recess 30. The clutch service port 42 is then connected in fluid communication with the fluid pressure inlet recess 28 by way of a fluid path defined by the hollow lower end of the clutch control spool 54 and a passage 92 in the spool 54, which extends from the hollow lower end to the groove 86 thereof.

Thus, with the valve plunger 50 in its fully released position, both the brake service port 40 and the clutch service port 42 will be pressurized and consequently, any pressure-disengaged brake connected to the port 40 would be disengaged and any pressure-engaged clutch connected to the port 42 would be engaged and assuming the left valve 14' to be in a like position, a straight line driving condition would be established in the track drive of an associated vehicle.

Now, considering the steering control valve with the plunger 50 fully depressed to a position corresponding to the plunger 50' of the right valve spool 14', the brake service port 40 is connected in fluid comunication with the exhaust recess 24 while the clutch service port 42 is connected in fluid communication with the exhaust recess 30. Specifically, the lower end of the brake control spool 52 abuts the upper end of the plunger 50 which holds the spool 52 in a position wherein the lower land 68 closes the pressure inlet recess 22 and the groove 72 is in fluid communication with the exhaust recess 24, the brake service port 40 thus being connected to the exhaust recess 24 via the hollow upper end of the spool 52, the passage 78 and the groove 72.

The stiffness of the springs 56, 58, and 60 and the locations of the various lands of the control spools 52 and 54 to the various sump, service and pressure recesses are such that as the plunger 50 is moved from its released to its fully depressed position, the clutch spool 54 will move to connect the clutch service port 42 to the sump recess 30 prior to the brake spool 52 moving to connect the brake service port 40 to the sump recess 24. In this way, the respective drive to the pair of tracks is disengaged prior to engagement of the associated brake.

It should be noted that the reacting forces on the brake and clutch control spools of the control valves 14 and 14' is a spring or constant hydraulic force (source pressure) while the applied force is via respective springs and function hydraulic pressures. This is in contrast to prior art systems where the applied force is solely via a spring and the reacting force is strictly function hydraulic pressure. The advantage is that the amount of manual force needed to operate the valve is minimized, the clutch and brake valves can be positioned axially in concentric bores for single plunger contact and both clutch and brake engagement can be controlled for controlled turning radius.

We claim:

1. A hydraulic control valve for effecting the sequential actuation of pressure-released steering brakes and pressure-engaged steering clutches, comprising: a valve body having a valve bore therein; said valve bore forming, at axially spaced locations thereof, a brake service recess, a first pressure recess, a first sump recess, a clutch service recess, a second pressure recess, a second sump recess, a third pressure recess and an abutment surface facing in the direction of the recesses arranged in serial order proceeding from a first toward a second end of the bore; a spool valve means reciprocably mounted in the bore and comprised of three separate sections including a valve operating plunger extending through the first end of the bore, a brake spool located next to the plunger for selectively connecting the brake service recess with one or the other of the first pressure and sump recesses, and a clutch spool located next to the brake spool for selectively connecting the clutch service recess to one or the other of the second pressure recess and sump recess; first, second, and third coil compression springs located in the bore with the first spring having opposite ends engaged with the plunger and brake control spool, with the second spring having opposite ends engaged with the brake spool and the clutch control spool and with the third spring having one end engaged with the clutch spool and another end engaged with the abutment surface presented by the bore.

* * * * *